US010025851B2

(12) United States Patent
Takaai et al.

(10) Patent No.: US 10,025,851 B2
(45) Date of Patent: Jul. 17, 2018

(54) INFORMATION PROCESSING APPARATUS, INFORMATION PROCESSING METHOD AND NON-TRANSITORY COMPUTER READABLE MEDIUM

(71) Applicant: FUJI XEROX CO., LTD., Tokyo (JP)

(72) Inventors: Motoyuki Takaai, Yokohama (JP); Seiji Suzuki, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 357 days.

(21) Appl. No.: 14/718,379

(22) Filed: May 21, 2015

(65) Prior Publication Data

US 2016/0132592 A1    May 12, 2016

(30) Foreign Application Priority Data

Nov. 6, 2014    (JP) .................................. 2014-226010

(51) Int. Cl.
*G06F 17/30* (2006.01)
(52) U.S. Cl.
CPC .. *G06F 17/30696* (2013.01); *G06F 17/30011* (2013.01); *G06F 17/30622* (2013.01)
(58) Field of Classification Search
CPC ......... G06F 17/30696; G06F 17/30011; G06F 17/30622
See application file for complete search history.

(56) References Cited

U.S. PATENT DOCUMENTS

| 5,535,382 | A | * | 7/1996 | Ogawa | G06F 17/30687 |
| 7,822,752 | B2 | | 10/2010 | Lin et al. | |
| 2008/0288483 | A1 | * | 11/2008 | Lin | G06F 17/30675 |
| 2010/0332503 | A1 | | 12/2010 | Buckley et al. | |
| 2011/0004588 | A1 | * | 1/2011 | Leitersdorf | G06F 17/30864 707/711 |
| 2013/0151533 | A1 | * | 6/2013 | Udupa | G06F 17/30646 707/742 |

FOREIGN PATENT DOCUMENTS

| JP | H02-158870 A | 6/1990 |
| JP | H03-129472 A | 6/1991 |

OTHER PUBLICATIONS

Aug. 18, 2016 Australian Office Action issued in Australian Patent Application No. 2015203102.

* cited by examiner

*Primary Examiner* — Apu Mofiz
*Assistant Examiner* — Husam T Samara
(74) *Attorney, Agent, or Firm* — Oliff PLC

(57) ABSTRACT

There is provided information processing apparatus. An extraction unit extracts features of a selected document from an inverted index in which documents and features of the documents are associated. A retrieval unit retrieves a document having any one of the features extracted by the extraction unit by the inverted index. A selection unit selects a feature of the features corresponding to a plurality of retrieval results by the retrieval unit, the feature having a high effect of narrowing down the retrieval results. A presentation unit presents a combination of the features selected by the selection unit, as a retrieval condition.

7 Claims, 11 Drawing Sheets

FIG. 5

|    | p1 | p2 | p3 | p4 | p5 | p6 | p7 |
|----|----|----|----|----|----|----|----|
| d1 | 1  | 1  | 1  | 1  | 1  | 1  | 0  |
| d2 | 1  | 1  | 1  | 1  | 1  | 1  | 0  |
| d3 | 1  | 1  | 1  | 1  | 1  | 1  | 1  |
| d4 | 1  | 1  | 1  | 1  | 1  | 0  | 1  |
| d5 | 1  | 1  | 1  | 1  | 0  | 1  | 1  |
| d6 | 1  | 1  | 1  | 0  | 1  | 0  | 1  |
| d7 | 1  | 0  | 0  | 1  | 1  | 1  | 1  |
| d8 | 1  | 1  | 0  | 1  | 1  | 1  | 0  |
| d9 | 1  | 0  | 0  | 1  | 1  | 0  | 1  |
| d10| 0  | 1  | 1  | 0  | 1  | 0  | 1  |

FIG. 6

|    | p1 | p2 | p3 | p4 | p5 | p6 | p7 |
|----|----|----|----|----|----|----|----|
| d1 | 1  | 1  | 1  | 1  | 1  | 1  | 0  |
| d2 | 1  | 1  | 1  | 1  | 1  | 1  | 0  |
| d3 | 1  | 1  | 1  | 1  | 1  | 1  | 1  |
| d4 | 1  | 1  | 1  | 1  | 1  | 0  | 1  |
| d5 | 1  | 1  | 1  | 1  | 0  | 1  | 1  |
| d6 | 1  | 1  | 1  | 0  | 1  | 0  | 1  |
| d7 | 1  | 0  | 0  | 1  | 1  | 1  | 1  |
| d8 | 1  | 1  | 0  | 1  | 1  | 1  | 0  |
| d9 | 1  | 0  | 0  | 1  | 1  | 0  | 1  |
| d10| 0  | 1  | 1  | 0  | 1  | 0  | 1  |

FIG. 7

|    | p1 | p2 | p3 | p4 | p5 | p6 | p7 |
|----|----|----|----|----|----|----|----|
| d1 | 1  | 1  | 1  | 1  | 1  | 1  | 0  |
| d2 | 1  | 1  | 1  | 1  | 1  | 1  | 0  |
| d3 | 1  | 1  | 1  | 1  | 1  | 1  | 1  |
| d4 | 1  | 1  | 1  | 1  | 1  | 0  | 1  |
| d5 | 1  | 1  | 1  | 1  | 0  | 1  | 1  |
| d6 | 1  | 1  | 1  | 0  | 1  | 0  | 1  |
| d7 | 1  | 0  | 0  | 1  | 1  | 1  | 1  |
| d8 | 1  | 1  | 0  | 1  | 1  | 1  | 0  |
| d9 | 1  | 0  | 0  | 1  | 1  | 0  | 1  |
| d10| 0  | 1  | 1  | 0  | 1  | 0  | 1  |

FIG. 8

| | p1 | p2 | p3 | p4 | p5 | p6 | p7 |
|---|---|---|---|---|---|---|---|
| d1 | 1 | 1 | 1 | 1 | 1 | 1 | 0 |
| d2 | 1 | 1 | 1 | 1 | 1 | 1 | 0 |
| d3 | 1 | 1 | 1 | 1 | 1 | 1 | 1 |
| d4 | 1 | 1 | 1 | 1 | 1 | 0 | 1 |
| d5 | 1 | 1 | 1 | 1 | 0 | 1 | 1 |
| d6 | 1 | 1 | 1 | 0 | 1 | 0 | 1 |
| d7 | 1 | 0 | 0 | 1 | 1 | 1 | 1 |
| d8 | 1 | 1 | 0 | 1 | 1 | 1 | 0 |
| d9 | 1 | 0 | 0 | 1 | 1 | 0 | 1 |
| d10 | 0 | 1 | 1 | 0 | 1 | 0 | 1 |

FIG. 9

| | p1 | p2 | p3 | p4 | p5 | p6 | p7 |
|---|---|---|---|---|---|---|---|
| d1 | 1 | 1 | 1 | 1 | 1 | 1 | 0 |
| d2 | 1 | 1 | 1 | 1 | 1 | 1 | 0 |
| d3 | 1 | 1 | 1 | 1 | 1 | 1 | 1 |
| d4 | 1 | 1 | 1 | 1 | 1 | 0 | 1 |
| d5 | 1 | 1 | 1 | 1 | 0 | 1 | 1 |
| d6 | 1 | 1 | 1 | 0 | 1 | 0 | 1 |
| d7 | 1 | 0 | 0 | 1 | 1 | 1 | 1 |
| d8 | 1 | 1 | 0 | 1 | 1 | 1 | 0 |
| d9 | 1 | 0 | 0 | 1 | 1 | 0 | 1 |
| d10 | 0 | 1 | 1 | 0 | 1 | 0 | 1 |

FIG. 10

| | p1 | p2 | p3 | p4 | p5 | p6 | p7 |
|---|---|---|---|---|---|---|---|
| d1 | 1 | 1 | 1 | 1 | 1 | 1 | 0 |
| d2 | 1 | 1 | 1 | 1 | 1 | 1 | 0 |
| d3 | 1 | 1 | 1 | 1 | 1 | 1 | 1 |
| d4 | 1 | 1 | 1 | 1 | 1 | 0 | 1 |
| d5 | 1 | 1 | 1 | 1 | 0 | 1 | 1 |
| d6 | 1 | 1 | 1 | 0 | 1 | 0 | 1 |
| d7 | 1 | 0 | 0 | 1 | 1 | 1 | 1 |
| d8 | 1 | 1 | 0 | 1 | 1 | 1 | 0 |
| d9 | 1 | 0 | 0 | 1 | 1 | 0 | 1 |
| d10 | 0 | 1 | 1 | 0 | 1 | 0 | 1 |

| | WORD 1 | WORD 2 | WORD 3 | WORD 4 | WORD 5 | WORD 6 | WORD 7 |
|---|---|---|---|---|---|---|---|
| d1 | 0.01 | 0.3 | 0.4 | 0.01 | 0.04 | 0.1 | 0 |
| d2 | 0.05 | 0.2 | 0.5 | 0.09 | 0.06 | 0.2 | 0 |
| d3 | 0.02 | 0.1 | 0.4 | 0.1 | 0.03 | 0.3 | 0.5 |
| d4 | 0.03 | 0.3 | 0.3 | 0.03 | 0.07 | 0 | 0.5 |
| d5 | 0.01 | 0.4 | 0.1 | 0.02 | 0 | 0.3 | 0.4 |
| d6 | 0.02 | 0.1 | 0.5 | 0 | 0.02 | 0 | 0.3 |
| d7 | 0.04 | 0 | 0 | 0.06 | 0.03 | 0.2 | 0.1 |
| d8 | 0.03 | 0.4 | 0 | 0.07 | 0.05 | 0.1 | 0 |
| d9 | 0.02 | 0 | 0 | 0.03 | 0.03 | 0 | 0.2 |
| d10 | 0 | 0.2 | 0.2 | 0 | 0.04 | 0 | 0.4 |

| | p1 | p2 | p3 | p4 | p5 | p6 | p7 |
|---|---|---|---|---|---|---|---|
| d1 | 1 | 1 | 1 | 1 | 1 | 1 | 0 |
| d2 | 1 | 1 | 1 | 1 | 1 | 1 | 0 |
| d3 | 1 | 1 | 1 | 1 | 1 | 1 | 1 |
| d4 | 1 | 1 | 1 | 1 | 0 | 0 | 1 |
| d5 | 1 | 1 | 1 | 0 | 1 | 1 | 1 |
| d6 | 1 | 0 | 0 | 1 | 1 | 0 | 1 |
| d7 | 1 | 1 | 0 | 1 | 1 | 1 | 0 |
| d8 | 1 | 0 | 0 | 1 | 1 | 0 | 1 |
| d9 | 1 | 1 | 1 | 0 | 1 | 0 | 1 |
| d10 | 0 | 1 | 1 | 0 | 1 | 0 | 1 |

1250 (1200):

| | ¬p1 | ¬p2 | ¬p3 | ¬p4 | ¬p5 | ¬p6 | ¬p7 |
|---|---|---|---|---|---|---|---|
| d1 | 0 | 0 | 0 | 0 | 0 | 0 | 1 |
| d2 | 0 | 0 | 0 | 0 | 0 | 0 | 1 |
| d3 | 0 | 0 | 0 | 0 | 0 | 0 | 0 |
| d4 | 0 | 0 | 0 | 0 | 0 | 1 | 0 |
| d5 | 0 | 0 | 0 | 1 | 1 | 0 | 0 |
| d6 | 0 | 1 | 1 | 0 | 0 | 1 | 0 |
| d7 | 0 | 0 | 1 | 0 | 0 | 0 | 0 |
| d8 | 0 | 1 | 1 | 1 | 0 | 1 | 1 |
| d9 | 0 | 0 | 0 | 0 | 0 | 1 | 0 |
| d10 | 1 | 0 | 0 | 1 | 0 | 1 | 0 |

INFORMATION PROCESSING APPARATUS, INFORMATION PROCESSING METHOD AND NON-TRANSITORY COMPUTER READABLE MEDIUM

CROSS-REFERENCE TO RELATED APPLICATIONS

This application is based on and claims priority under 35 U.S.C. § 119 from Japanese Patent Application No. 2014-226010 filed on Nov. 6, 2014.

TECHNICAL FIELD

The present invention relates to an information processing apparatus, an information processing method and a non-transitory computer readable medium.

SUMMARY

According to an aspect of the embodiments of the present invention, there is provided an information processing apparatus comprising: an extraction unit that extracts features of a selected document from an inverted index in which documents and features of the documents are associated; a retrieval unit that retrieves a document having any one of the features extracted by the extraction unit by the inverted index; a selection unit that selects a feature of the features corresponding to a plurality of retrieval results by the retrieval unit, the feature having a high effect of narrowing down the retrieval results; and a presentation unit that presents a combination of the features selected by the selection unit, as a retrieval condition.

BRIEF DESCRIPTION OF THE DRAWINGS

Exemplary embodiments of the present invention will be described in detailed based on the following figures, wherein:

FIG. 5 illustrates a processing example of the illustrative embodiment;

FIG. 6 illustrates a processing example of the illustrative embodiment;

FIG. 7 illustrates a processing example of the illustrative embodiment;

FIG. 8 illustrates a processing example of the illustrative embodiment;

FIG. 9 illustrates a processing example of the illustrative embodiment;

FIG. 10 illustrates a processing example of the illustrative embodiment;

FIG. 11 illustrates a processing example of the illustrative embodiment;

FIG. 12 illustrates a processing example of the illustrative embodiment;

DETAILED DESCRIPTION

Hereinafter, an illustrative embodiment suitable for implementation of the present invention will be described with reference to the drawings.

Figure 1:
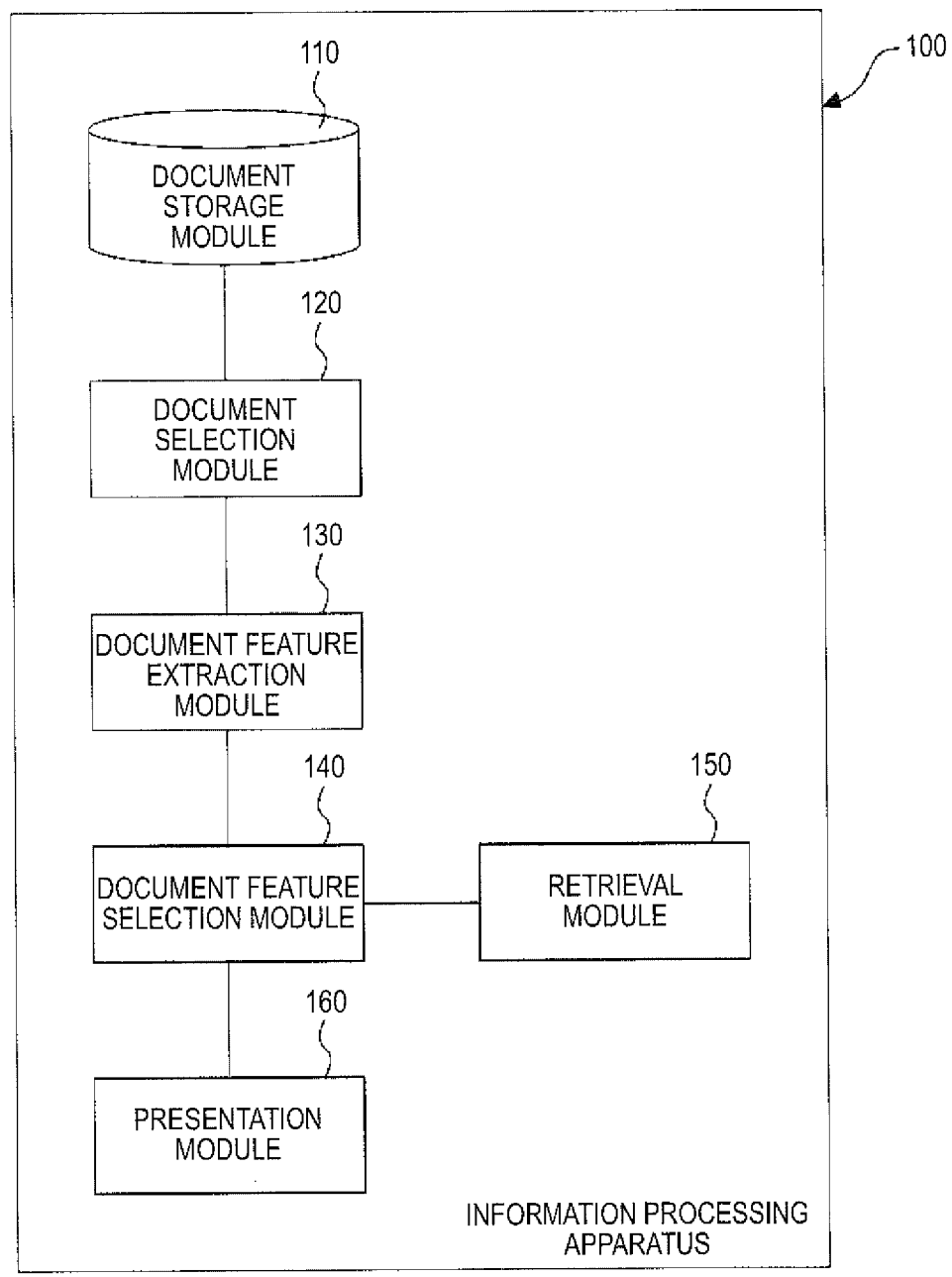
FIG. 1 is a conceptual module configuration view relating to a configuration example of an illustrative embodiment.

FIG. 1 is a conceptual module configuration view relating to a configuration example of an illustrative embodiment.

It should be noted that a module refers to a software component that is logically separable (a computer program), or a hardware component. Therefore, in the illustrative embodiment, the module refers to not only a module in a computer program but also a module in a hardware configuration. For this reason, the description of the illustrative embodiment also serves as descriptions of computer programs for enabling the modules to function (including a program for enabling a computer to execute each procedure, a program for enabling the computer to function as each means, and a program for enabling the computer to implement each function), a system and a method. For convenience of description, 'stores information,' 'causes information to be stored,' and other phrases equivalent thereto are used. However, when the illustrative embodiment is a computer program, these phrases are intended to express 'causes a storage device to store information' or 'controls a storage device to store information.' The modules may correspond to the functions in a one-to-one correspondence. However, in implementation, one module may be composed of one program or multiple modules may be composed of one program, and inversely, one module may be composed of multiple programs. Also, a plurality of modules may be executed by a single computer, and a single module may be executed by a plurality of computers in a distributed or parallel environment. In the meantime, one module may include another module. Also, in the following description, 'connection' refers to not only a physical connection but also a logical connection (such as an exchange of data, instructions, and data reference relationship). 'Predetermined' means that something is determined in advance of a process of interest, and thus intends to refer to not only something that is determined in advance of a process of interest in the illustrative embodiment but also even after a process in the illustrative embodiment has started, something that is determined in advance of a process of interest depending on a condition or a status of the illustrative embodiment at the present point of time or depending on a condition or status heretofore continuing down to the present point of time. When there is a plurality of 'predetermined values', they may be different, respectively, or two or more values (including all values) thereof may be the same. In addition, a description that means 'If A, B is performed' is used to convey the meaning 'it is determined whether a condition A is satisfied, and if the condition A is satisfied, B is performed.' However, this is not applicable if the determination as to whether the condition A is satisfied or not is unnecessary.

Also, a system or an apparatus refers to a configuration in which a plurality of computers, a hardware configuration, an apparatus and the like are interconnected via a communication means such as a network (including a one-to-one communication connection), and also includes a case implemented by a single computer, a hardware configuration, an apparatus and the like. The word 'apparatus' and the word 'system' have the same definition. Of course, the 'system' does not include merely a social 'structure' (social system) formulated by humans.

Also, at each process performed by a module, or at one of the processes performed by a module, information to be processed is read from a storage device and then processed, and thereafter, the process results are written onto the storage device. Accordingly, the descriptions of reading of the information from the storage device prior to the process and writing of the processed information onto the storage device subsequent to the process are omitted in some cases. The storage devices here may include a hard disc, a random access memory (RAM), an external storage medium, a storage device connected via a communication line, a register within a central processing unit (CPU), and the like.

An information processing apparatus 100 that is this illustrative embodiment is configured to present a combination of features of a document as a retrieval condition, and includes a document storage module 110, a document selection module 120, a document feature extraction module 130, a document feature selection module 140, a retrieval module 150, and a presentation module 160, as shown in FIG. 1. A feature of a document may be any feature becoming a retrieval word when retrieving the document. For example, the feature may be a word in the document or an attribute of the document.

In general, a retrieval system is a system configured to receive a retrieval condition from a user and to present a document satisfying the condition. Here, the retrieval condition is expressed by a combination of one or more features that each document inherently has.

For example, a full-text retrieval system is configured to receive some input keywords as a retrieval condition, to determine whether the keywords are included in a document text, and to return, as a retrieval result, a document including all the given keywords.

However, in general, a user does not know what features the accumulated documents have and how the accumulated documents are indexed in the retrieval system. Further, the user does not have knowledge about a method of giving a retrieval condition for efficiently narrowing down candidates. Therefore, the user should repeat trial and error of inputting retrieval conditions several times and checking results. That is, in the general retrieval system, when the user does not know well how the documents stored in a document server and the like are characterized, it is difficult for the user to learn an effective retrieval method.

This illustrative embodiment provides the user with a retrieval condition mainly for learning. In this illustrative embodiment, a retrieval condition for narrowing down to a document selected by a user is presented. The user can learn a better retrieval condition for reaching the document. Also, the user can obtain a desired document and a retrieval method by modifying (deleting, changing, adding) a part of the retrieval condition.

The document storage module 110 is connected to the document selection module 120. The document storage module 110 is configured to store therein documents. Also, the document storage module 110 may be configured to store therein an inverted index in which documents and features of the documents are associated so as to retrieve the documents. Here, the inverted index indicates an index structure for storing position information of words from a document group for which a full-text retrieval is performed. In the meantime, the document storage module 110 is not necessarily configured in the information processing apparatus 100. For example, the document storage module 110 may be connected to the information processing apparatus 100 through a communication line.

The document selection module 120 is connected to the document storage module 110 and the document feature extraction module 130. The document selection module 120 is configured to select a document in the document storage module 110, in accordance with a selection operation of a user. Here, the document is mainly text data, in some cases, electronic data (also referred to as a file) such as a figure, an image, a moving image, voice and the like, or a combination thereof, and indicates something or similar thereto that is a target of retrieval, storing, editing and the like and can be exchanged as an individual unit between systems or users. Specifically, a document prepared by a document preparation program, a Web page and the like may be exemplified. The number of documents to be selected may be one or more.

The document feature extraction module 130 is connected to the document selection module 120 and the document feature selection module 140. The document feature extraction module 130 is configured to extract features of a selected document, from the inverted index in which documents and features of the documents are associated.

Also, the document feature extraction module 130 may be configured to extract negation of features of a selected document, from the inverted index.

The retrieval module 150 is connected to the document feature selection module 140. The retrieval module 150 is configured to retrieve a document having any one of the features, which are extracted by the document feature extraction module 130, by the inverted index.

The document feature selection module 140 is connected to the document feature extraction module 130, the retrieval module 150, and the presentation module 160. The document feature selection module 140 is configured to select a feature of features corresponding to a plurality of retrieval results by the retrieval module 150, which has a high effect of narrowing down the retrieval results. Also, the document feature selection module 140 may be configured to be controlled so that the retrieval processing of the retrieval module 150 and the selection processing of the document feature selection module 140 are repeated.

Also, the document feature selection module 140 may be configured to select a feature for which a number of documents retrieved by the retrieval module 150 is smallest, a feature for which a decrease number of the documents is largest or a feature of which an angle with a previously selected feature vector conforms to a predetermined condition. Here, the predetermined condition may include a condition that the angle is closest to the orthogonal state.

Also, the document feature selection module 140 may be configured to select a feature corresponding to a degree of familiarity of the user. The degree of familiarity is a value indicating that the larger the value, the user knows a word better. Here, the 'feature corresponding to a degree of familiarity of the user' may be a feature that the degree of familiarity of the user is greater than or equal to or higher than a predetermined threshold value or a feature that the degree of familiarity of the user is less than or equal to or less than a predetermined rank when the degrees of familiarity of the user are sorted in descending order, so as to present a familiar word. Inversely, the 'feature corresponding to a degree of familiarity of the user' may be a feature that the degree of familiarity of the user is less than or equal to or less than a predetermined threshold value or a feature that the degree of familiarity of the user is less than or equal to or less than a predetermined rank when the degrees of familiarity of the user are sorted in ascending order, so as to present an unfamiliar word and to learn an unknown word.

The presentation module 160 is connected to the document feature selection module 140. The presentation module 160 is configured to present a combination of the features selected by the document feature selection module 140, as a retrieval condition. For example, the combination is presented on a display device such as a liquid crystal monitor. Also, the presentation module 160 may be configured to present the features as the retrieval condition, in accordance with a sequence selected by the document feature selection module 140.

Also, the presentation module 160 may be configured to present a result of the retrieval that has been performed using a combination of the features selected by the document feature selection module 140 as a retrieval condition.

Figure 2A:
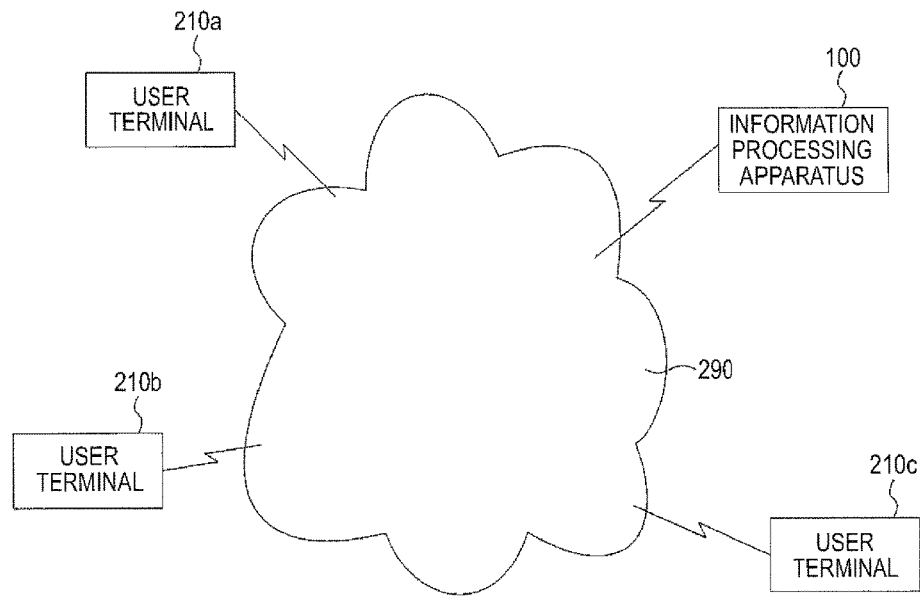
FIGS. 2A and 2B illustrate examples of a system configuration using the illustrative embodiment.
Figure 2B:
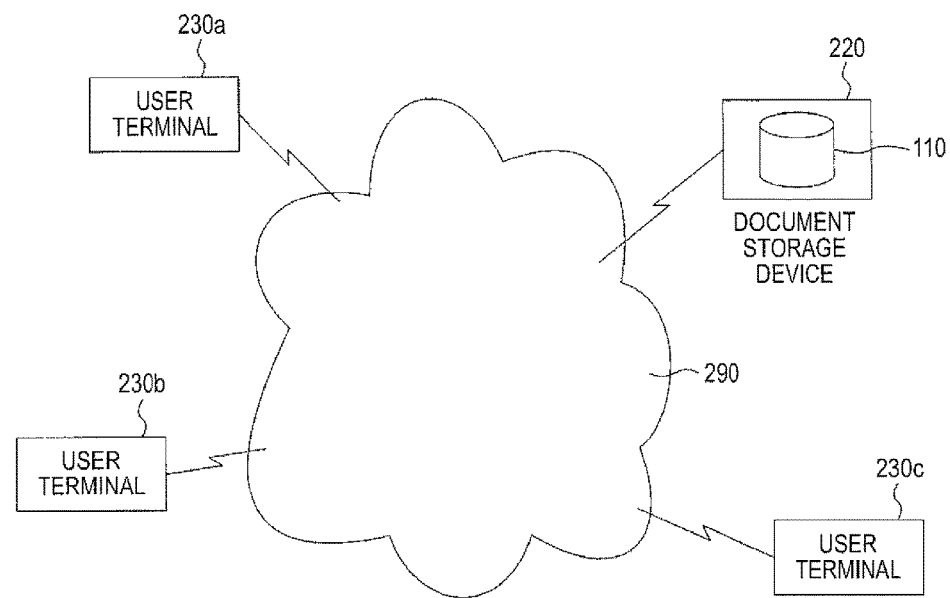

FIGS. 2A and 2B illustrate examples of a system configuration using the illustrative embodiment.

In the example of FIG. 2A, the information processing apparatus 100, a user terminal 210*a*, a user terminal 210*b*, and a user terminal 210*c* are respectively connected through a communication line 290. The information processing apparatus 100 is used as a server (including the information processing apparatus configuring a cloud computing) from each user terminal 210. The retrieval processing and the like are collectively performed by the information processing apparatus 100, and a presentation result by the presentation module 160 is displayed on a browser of each user terminal 210.

In the example of FIG. 2B, a document storage device 220, a user terminal 230*a*, a user terminal 230*b*, and a user terminal 230*c* are respectively connected through the communication line 290. The document storage device 220 has the document storage module 110, and each user terminal 230 has the document selection module 120, the document feature extraction module 130, the document feature selection module 140, the retrieval module 150, and the presentation module 160. The document storage device 220 functioning as a document server having the document storage module 110 is used from each user terminal 210.

Figure 3:
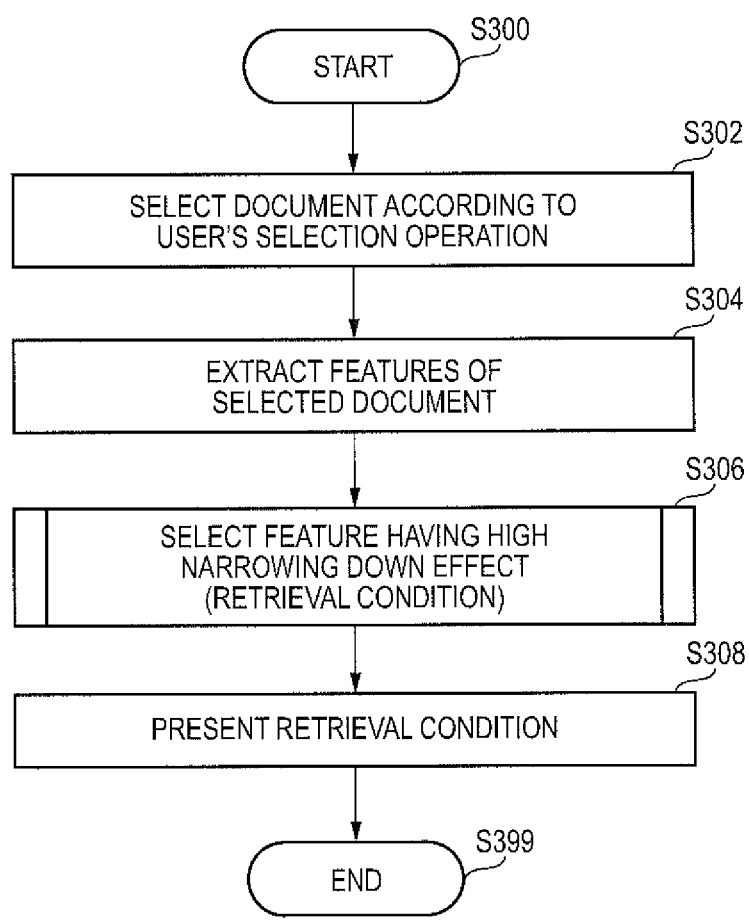
FIG. 3 is a flowchart showing a processing example of the illustrative embodiment.

FIG. 3 is a flowchart showing a processing example of the illustrative embodiment.

In step S302, the document selection module 120 selects a document from the document storage module 110 in accordance with a selection operation of the user. For example, one or more documents that the user wants are selected from a presented document list by a user's operation using a mouse, a keyboard, a touch panel, voice and the like. In this case, a retrieval condition appropriate to retrieval of the document is presented.

In step S304, the document feature extraction module 130 extracts features of the document selected in step S302. Here, when a plurality of documents is selected, the features common to all the documents are selected.

In step S306, the document feature selection module 140 selects a feature (retrieval condition) having a high narrowing down effect. The document feature selection module 140 evaluates retrieval scores and the like when the features extracted in step S304 are used as the retrieval condition, and selects the feature. This processing will be described in detail later with reference to a flowchart of FIG. 4.

In step S308, the presentation module 160 presents a retrieval condition. The presentation module 160 presents the user with a retrieval condition for performing a retrieval using the feature selected in step S306 as a key.

Figure 4:
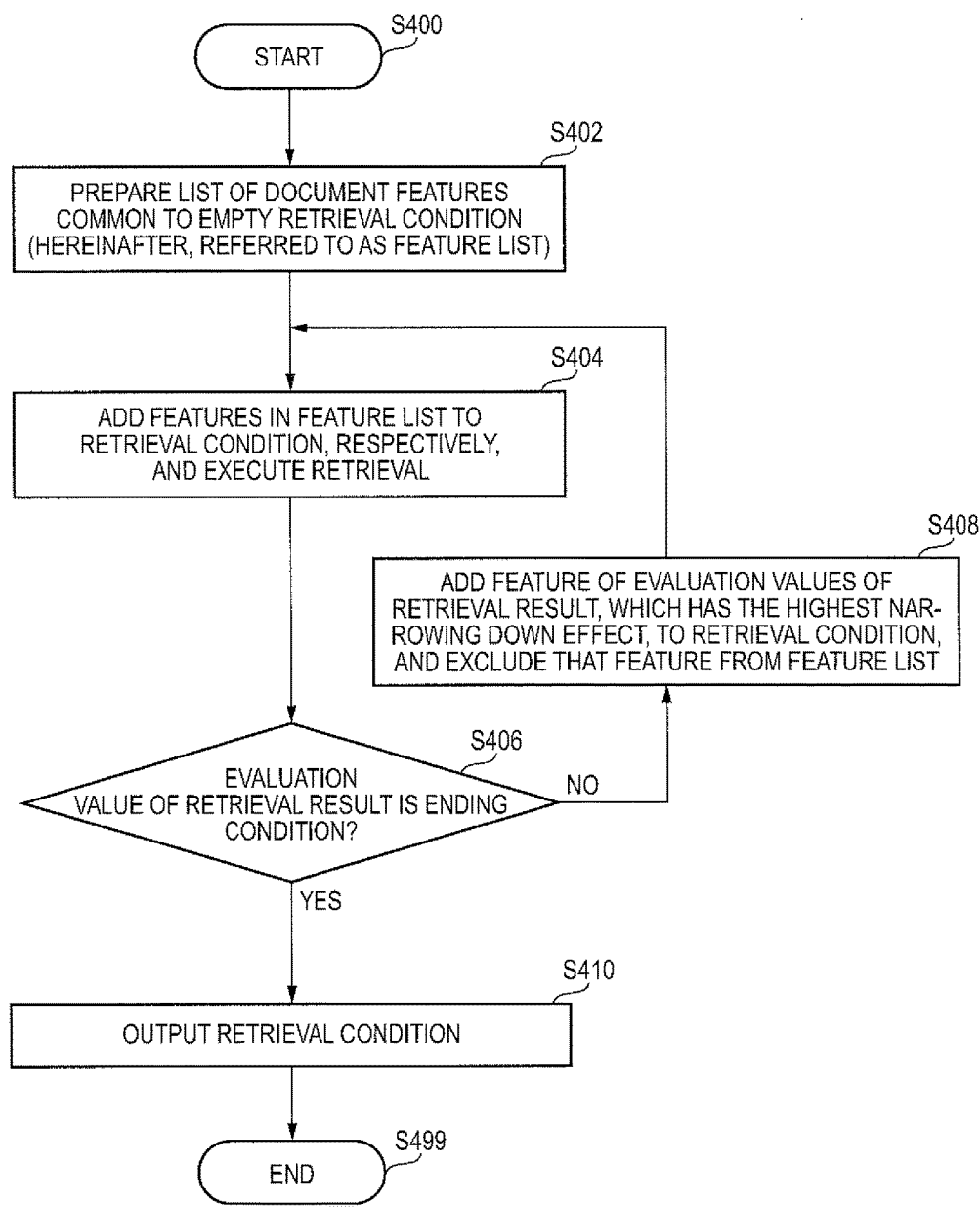
FIG. 4 is a flowchart showing a processing example of the illustrative embodiment.

FIG. 4 is a flowchart showing a processing example of the illustrative embodiment.

In step S402, the document feature selection module 140 prepares a list (hereinafter, referred to as 'feature list') of document features common to an empty retrieval condition. Regarding a retrieval condition of parameters, a finally presented retrieval condition is stored and an original state is empty. The feature list is a feature group (a set of one or more features) extracted in step S304 of the flowchart shown in FIG. 3.

In step S404, the document feature selection module 140 adds the features in the feature list to the retrieval condition, respectively, and executes the retrieval. In first processing, since the retrieval condition is empty, the retrieval is executed with one feature in the feature list. In second processing, the retrieval is executed with two features (AND retrieval with two features) because one feature has been set in step S408. Likewise, in third processing and thereafter, after one feature is added in step S408, the retrieval in which the feature in the feature list is added is executed (AND retrieval with three or more features).

In step S406, the document feature selection module 140 determines whether an evaluation value of the retrieval result complies with an ending condition. When the evaluation value complies with the ending condition, the document feature selection module 140 proceeds to step S410, and otherwise, proceeds to step S408. Here, regarding the determination as to whether to end the processing, it may be determined to end the processing when the number of documents of a previous retrieval result is not different from the number of documents of this time retrieval result (when comparing the previous and this time retrieval results, a decrease amount of the number of documents is zero (0)), when the decrease amount is smaller than or equal to or smaller than a predetermined threshold value, when the determination is repeated by a predetermined number of times, or when the number of documents of the retrieval result is smaller than or equal to or smaller than a predetermined threshold value.

In step S408, the document feature selection module 140 adds a feature of the evaluation values of the retrieval result, which has the highest narrowing down effect, to the retrieval condition, excludes the corresponding feature from the feature list and returns to step S404. Meanwhile, regarding the evaluation value, the higher the narrowing down effect of the retrieval result, the evaluation value becomes greater. For example, the decrease amount (difference) between the number of documents of the previous retrieval result and the number of documents of this time retrieval result may be adopted. In this case, in the first processing of step S408, the number of all documents in the document storage module 110 may be adopted as the 'previous retrieval result'.

In step S410, the document feature selection module 140 outputs a retrieval condition. That is, the document feature selection module 140 presents contents of the retrieval condition as parameters at this moment.

In the below, a specific example is described.

In the specific example, a case where documents d1, . . . , d10 have features p1, . . . , p7, respectively, is described.

Here, the feature indicates whether any word is included in a document, whether any tag is attached to a document, whether an attribute is given to a document, and the like. Also, a feature amount of a feature p of a document d is a numerical value of strength of the feature p of the document d.

In the below, the feature amount is set to a binary of '0' and '1' so as to simplify the description.

The feature amounts of the features p1, . . . , p7 of the documents d1, . . . , d10 can be expressed by a matrix such as an inverted index 500 shown in FIG. 5.

For example, when (document d1, feature p1) is '1', it indicates that the document d1 has the feature p1. Likewise, when (document d10, feature p1) '0', it indicates that the document d10 does not have the feature p1.

Here, like a selected document 610 shown in FIG. 6, it is assumed that a user selects the documents d1,d2 in advance, as a document becoming a base.

The document feature extraction module 130 selects the features (the features for which both the documents d1, d2 are included in the retrieval result) for which both the documents d1, d2 become 1. That is, like a feature selection result 710 shown in FIG. 7, the six features p1, p2, p3, p4, p5, p6 are selected.

Then, the document feature selection module 140 extracts a combination of the features.

Here, it is regarded that a good retrieval condition is a condition with which the narrowing down effect is high, i.e., the number of documents to be obtained is largely reduced by adding the corresponding condition.

In this example, when all the documents (10 documents) are retrieved with the retrieval condition of the features of p1, p2, p3, p4, p5, p6, the number of documents of the retrieval result is as follows: the feature p1: 9 documents, the feature p2: 8 documents, the feature p3: 7 documents, the feature p4: 8 documents, the feature p5: 9 documents, and the feature p6: 6 documents (refer to a retrieval result 810, a retrieval result 812 and a retrieval result 814 shown in an example of FIG. 8). Therefore, the feature p6 is selected as the retrieval condition, like a selected retrieval condition 850 shown in the example of FIG. 8.

Then, regarding the documents d1, d2, d3, d5, d7, d8, which are the retrieval result performed with the retrieval condition having the feature p6 added thereto, the retrieval is performed with the retrieval condition of the remaining features. As a result, the feature for which the decrease amount of the number of documents is largest is selected. Like a selected retrieval condition 950 shown in an example of FIG. 9, when the feature p3 is selected, the retrieval result is the documents d1, d2, d3, d5 (refer to the retrieval result 810 and the retrieval result 812 shown in the example of FIG. 9).

Likewise, when the feature p5 is selected as an additional condition, like a selected retrieval condition 1050 shown in an example of FIG. 10, the retrieval result is the documents d1, d2, d3 (refer to the retrieval result 810 shown in the example of FIG. 10).

Then, even when any feature is selected, the number of documents is not decreased. Therefore, the processing of selecting the feature becoming the retrieval condition is over, and the obtained features are p6, p3 and p5 (refer to the selected retrieval condition 850, the selected retrieval condition 950 and the selected retrieval condition 1050 shown in the example of FIG. 10).

Therefore, the obtained retrieval condition is 'p6 AND p3 AND p5.'

Here, the interpretation of the retrieval formula is irrelevant to the sequence of the features. However, from a standpoint of the narrowing down effect enabling the efficient retrieval, the sequence of the features is meaningful. Therefore, the sequence may be presented to the user.

EXTENDED EXAMPLE 1

In the above illustrative embodiment, the decrease amount of the number of documents is considered as a result of the retrieval using the retrieval condition. However, the retrieval condition may be selected on the basis that the retrieval conditions are preferably orthogonal to each other.

When selecting a next feature $p_{xn+1}$ at a state where n features $p_{x1}, \ldots, p_{xn}$ are selected, angles between a document vector of $p_{xn+1}$ (a $p_{xn+1}$ column of the inverted index 500 is considered as a vector (10 dimensions)) and vectors of $p_{x1}, \ldots, p_{xn}$ are respectively calculated (a cosine value of the angle can be easily calculated using an inner product), and the feature $p_{xn+1}$ is selected so that the angle is the largest (for example, a minimum value of each of the features $p_{x1}, \ldots, p_{xn}$ becomes the largest). By this selection, it is possible to select a feature from a different standpoint as regards the retrieval.

EXTENDED EXAMPLE 2

In the above illustrative embodiment, the feature amount is set to the binary. For example, when a keyword is considered as a feature as regards the full-text retrieval, an actual value such as a tf·idf value (reference literature: Salton, Introduction to modern information retrieval, McGill M J (1986)) is given as the feature amount, so that a score of the actual value can be obtained as regards the retrieval result.

In this case, even though a feature for which the number of documents is largely decreased is selected, when a score or rank of a previously selected document is low in a retrieval result obtained from the feature, it is difficult to say that the retrieval condition reflects a user's intention. Therefore, it is preferably to consider the retrieval score when extracting the combination of the features.

For example, when selecting a feature, it may be possible to adopt a method of selecting a feature for which a value of 'decrease amount of the number of documents×minimum value of a feature amount (for example, a tf·idf value) of a selected document' is largest as a retrieval score.

In the below, a specific example is described.

It is assumed that the documents d1 to d10 are text files and scores of words included in the files are an inverted index 1100 shown in an example of FIG. 11.

The score is priced so that the score becomes smaller when the corresponding word is included over the documents and becomes larger when the corresponding word is much included in a specific document. For example, a calculation by a Tf·idf method is used. In the inverted index 1100 shown in the example of FIG. 11, a word 1 is a word included over several documents, such as "be (is, am, are)", and a word 7 is a word included in a specific document, such as a technical term.

Here, it is assumed that the documents d1, d2 are selected by a selection operation of the user.

The features included in both the documents d1, d2 are a word 1, a word 2, a word 3, a word 4, a word 5, and a word 6, and when all the documents (10 documents) are retrieved with the retrieval condition of each word, the number of documents and the decrease amount of the number of documents are as follows: word 1: 9 documents (decreased by one), word 2: 8 documents (decreased by two), word 3: 7 documents (decreased by three), word 4: 8 documents (decreased by two), word 5: 9 documents (decreased by one), and word 6: 6 documents (decreased by four).

Also, regarding each word, the minimum value of the tf·idf value of the document d1 and the document d2 is as follows: word 1: 0.01 word, word 2: 0.2 word, word 3: 0.4 word, word 5: 0.04 word, and word 6: 0.1 word.

Therefore, regarding each word, the value 'decrease amount of the number of documents×minimum value of the feature amount of selected document' is as follows: word 1: 1×0.01=0.01 word, word 2: 2×0.2=0.4 word, word 3: 3×0.4=1.2 words, word 4: 2×0.01=0.02 word, word 5: 1×0.04=0.04 word, and word 6: 4×0.1=0.4 word. Therefore, word 3 is selected as the retrieval condition. Thereafter, a word becoming the retrieval condition is selected in the same manner.

EXTENDED EXAMPLE 3

This illustrative embodiment is to support the learning so that the user can input a retrieval formula having the high narrowing down effect. However, for example, when a feature is set as an appearance of a word in a document, a word that is not familiar to the user may be presented. In this case, the user may lose the motivation for learning.

Therefore, regarding each feature, a degree of familiarity of the user with a feature is preferably given in advance.

The degree of familiarity may be extracted from features that the user has input as a retrieval condition in the past retrieval, features of a document prepared by the user, and the like.

For example, when selecting a feature, the degree of familiarity may be used. That is, a feature for which the value 'decrease amount of the number of documents×a degree of familiarity of the feature' is largest may be selected.

To the contrary, a word having a low degree of familiarity may be selected so that the user can learn an unknown word as a word necessary for retrieval. For example, when selecting a feature, a feature for which a value 'decrease amount of the number of documents/a degree of familiarity of the feature' is largest may be selected.

EXTENDED EXAMPLE 4

Negation (NOT) may be used as the retrieval condition.

That is, when extracting the features p1 to p7 of the documents d1 to d10, negations ¬p1, . . . , ¬p7 are considered as the retrieval condition, in addition to the features p1, . . . , p7.

In the case of the inverted index 500 shown in the example of FIG. 5, it is possible to indicate therein whether each document satisfies each feature (a retrieval condition group (positive) 1210) and negation thereof (a retrieval condition group (negative) 1250), like an inverted index 1200 shown in an example of FIG. 12.

Here, when the user selects the documents d1, d2, the features p1, p2, p3, p4, p4, p6, ¬p7 are obtained as the condition with which the documents can be retrieved. Among the features, the feature ¬p7 for which the decrease amount of the number of the documents is largest can be selected as the retrieval condition. Thereafter, the retrieval condition can be configured in the same manner.

EXTENDED EXAMPLE 5

The above illustrative embodiment is to support the learning so that the user can input a retrieval formula having the high narrowing down effect. However, for example, a document relating to the selected document may be retrieved.

Figure 13:
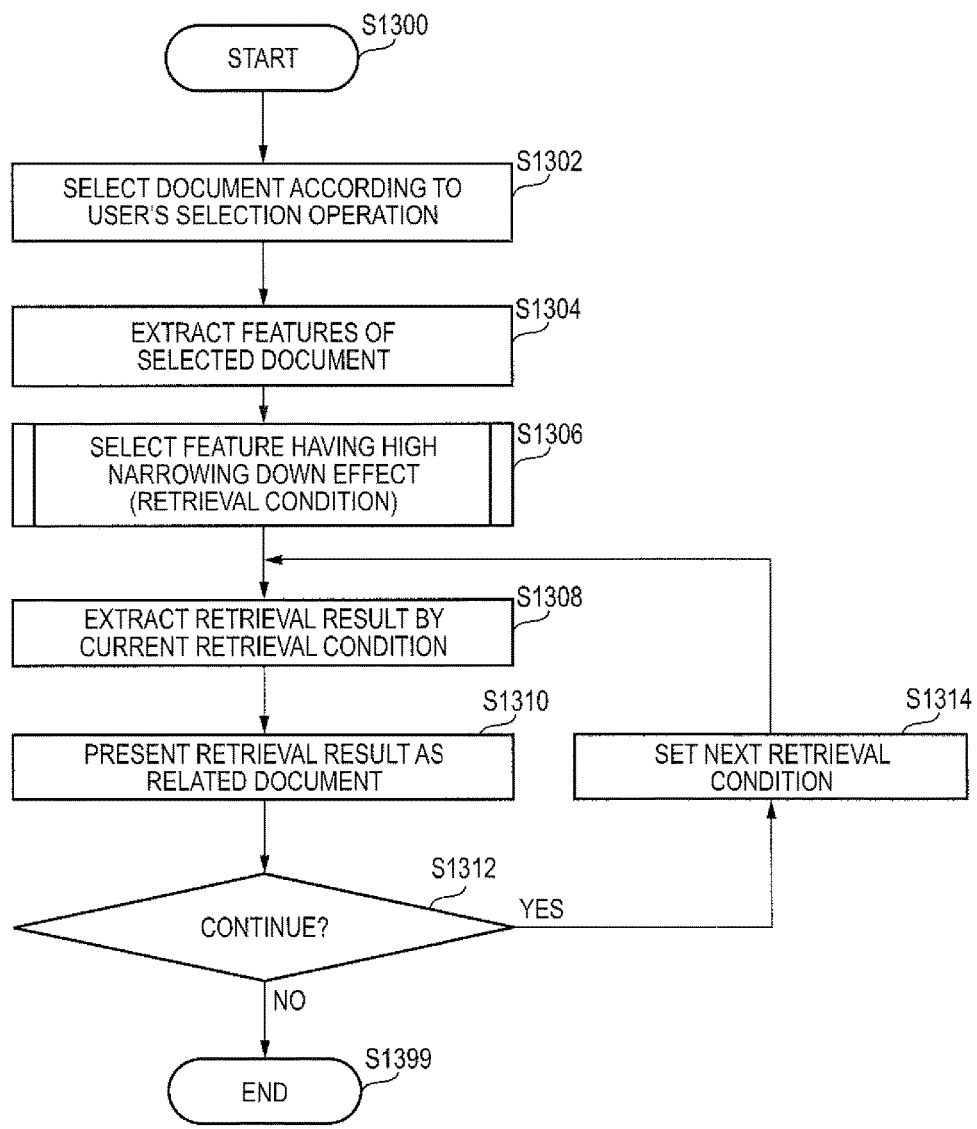
FIG. 13 is a flowchart showing a processing example of the illustrative embodiment.

FIG. 13 is a flowchart showing a processing example of an extended example 5.

In the flowchart of FIG. 13, steps S1308 to S1314 are added to the flowchart of FIG. 3.

In step S1302, the document selection module 120 selects a document from the document storage module 110, in accordance with a user's selection operation.

In step S1304, the document feature extraction module 130 extracts features of the selected document.

In step S1306, the document feature selection module 140 selects a feature (retrieval condition) having a high narrowing down effect. This processing will be described in detail later with reference to a flowchart of FIG. 14.

In step S1308, the presentation module 160 extracts a retrieval result corresponding to the current retrieval condition from the retrieval result stored in step S1306.

In step S1310, the presentation module 160 presents the retrieval result, as a related document.

In step S1312, the presentation module 160 determines whether to continue the retrieval. When it is determined to continue the retrieval, the presentation module 160 proceeds to step S1314, and otherwise, ends the processing (step S1399). The determination as to whether to continue the retrieval may be made in accordance with a user's instruction operation or may be made by determining whether the processing has been repeated by a predetermined number of times.

Figure 14:
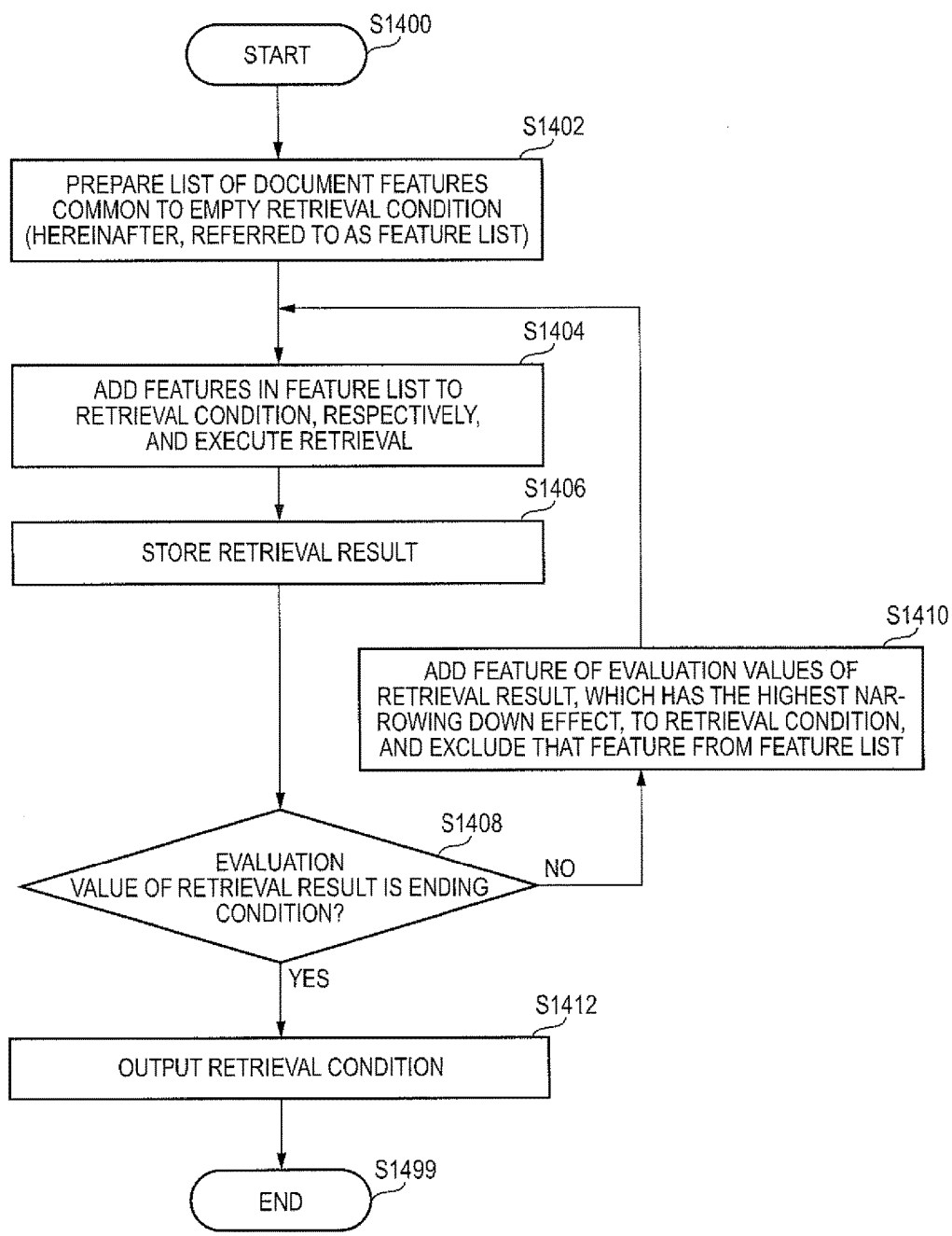
FIG. 14 is a flowchart showing a processing example of the illustrative embodiment.

In step S1314, the presentation module 160 sets a next retrieval condition. FIG. 14 is a flowchart showing an example of the processing (step S1306 of the flowchart shown in FIG. 13) of the extended example 5.

In the flowchart of FIG. 14, step S1406 is added to the flowchart of FIG. 4.

In step S1402, a list (hereinafter, referred to as 'feature list') of document features common to an empty retrieval condition is prepared.

In step S1404, the features in the feature list are respectively added to the retrieval condition and the retrieval is then executed.

In step S1406, a retrieval result is stored.

In step S1408, it is determined whether an evaluation value of the retrieval result complies with an ending condition. When the evaluation value complies with the ending condition, the processing proceeds to step S1412, and otherwise, proceeds to step S1410.

In step S1410, a feature of the evaluation values of the retrieval result, which has the highest narrowing down effect, is added to the retrieval condition, the corresponding feature is excluded from the feature list and the processing returns to step S1404.

In step S1412, a retrieval condition is output.

Meanwhile, in this processing example, the retrieval result (related document) is stored in step S1406, and the stored retrieval condition is presented. However, when presenting the related document, the retrieval may be again performed.

That is, the flowchart of FIG. 4 may be performed instead of the flowchart of FIG. 14, the retrieval may be performed with the current retrieval condition in step S1308 of FIG. 13, and the final retrieval condition may be excluded from the current retrieval condition and the retrieval condition may be set in step S1314.

Figure 15:
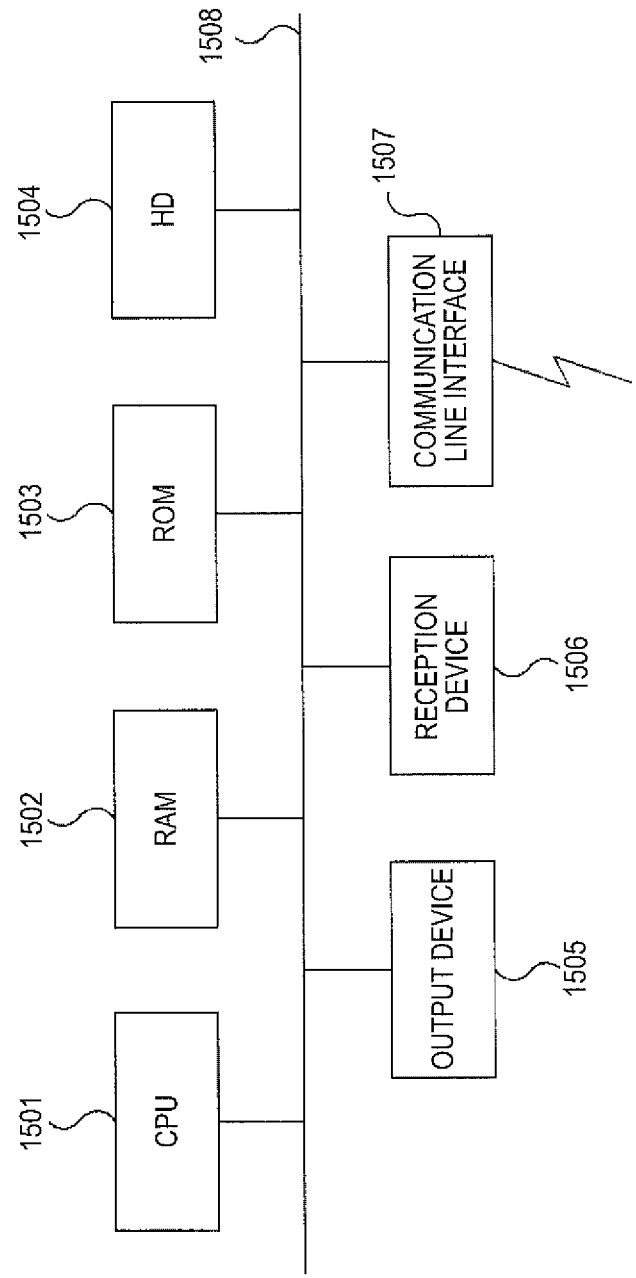
FIG. 15 is a block diagram showing a hardware configuration example of a computer configured to implement the illustrative embodiment.

In the meantime, the hardware configuration of the computer in which the program of the illustrative embodiment is executed is a general computer, and specifically, a personal computer, a computer becoming a server, and the like, as exemplified in FIG. 15. That is, as a specific example, a CPU 1501 is used as a processing unit (calculation unit), and a RAM 1502, a ROM 1503 and an HD 1504 are used as a storage device. As the HD 1504, a hard disc and a solid state drive (SSD) may be used, for example. The computer is configured by the CPU 1501 configured to execute the programs such as the document selection module 120, the document feature extraction module 130, the document feature selection module 140, the retrieval module 150, the presentation module 160 and the like, the RAM 1502 configured to store therein the programs and data, the ROM 1503 configured to store therein a program for activating the computer, the HD 1504 serving as an auxiliary storage device (also may be a flash memory and the like) having the functions of the document storage module 110 and the like, a reception device 1506 configured to receive data on the basis of a user's operation on a keyboard, a mouse, a touch panel and the like, an output device 1505 such as a CRT, a liquid crystal monitor and the like, a communication line interface for connection to a communication network such as a network interface card, and a bus 1508 for connecting the above constitutional elements to transmit and receive the data. A plurality of computers may be connected to each other by a network.

The above illustrative embodiment configured by the computer program is implemented by enabling the system having the hardware configuration to read a computer program, which is the software, and the software and the hardware resources to cooperate each other.

In the meantime, the hardware configuration shown in FIG. 15 shows one configuration example, this illustrative embodiment is not limited to the configuration shown in FIG. 15, and any configuration capable of executing the modules described in this illustrative embodiment can be used. For example, a part of the modules may be configured as a dedicated hardware configuration (for example, Application Specific Integrated Circuit (ASIC) and the like), a part of the module may be configured in an external system and connected via the communication line, and a plurality of systems shown in FIG. 15 may be connected to each other by the communication lines and configured to cooperatively operate each other. Also, the shown configuration may be incorporated into an information appliance, a copier, a facsimile, a scanner, a printer, a complex machine (an image processing apparatus having two or more functions of the scanner, the printer, the copier and the facsimile), and the like, in addition to the personal computer.

In the above illustrative embodiment, when comparing with a predetermined value, the description 'equal to or greater than', 'equal to or smaller than', 'greater than' and 'smaller than (less than)' may be replaced with the description 'greater than', 'smaller than (less than)', 'equal to or greater than' and 'equal to or smaller than', respectively, inasmuch as a combination thereof is not contradictory.

In the meantime, the described program may be provided with being stored in a recording medium or may be provided via a communication means. In this case, for example, the above described program may be interpreted as an invention of 'a computer-readable recording medium having a program recorded therein'.

The 'computer-readable recording medium having a program recorded therein' refers to a computer-readable recording medium having a program recorded therein, which is used to install, to execute, to distribute and the like the program.

In the meantime, the recording medium includes, for example, a digital versatile disc (DVD), such as 'DVD-R, DVD-RW, and DVD-RAM' complying with the standard formulated by the DVD forum and 'DVD+R and DVD+RW' complying with DVD+RW standards, a compact disc (CD), such as a read-only memory (CD-ROM), a CD recordable (CD-R) and a CD rewritable (CD-RW), a Blu-ray disc (registered trademark), a magneto-optical disc (MO), a flexible disc (FD), a magnetic tape, a hard disk, a read-only memory (ROM), an electronically erasable and programmable read-only memory (EEPROM (registered trademark)), a flash memory, a random access memory (RAM), and a secure digital (SD) memory card.

The above-described program or a part thereof may be stored in the recording medium for storage and distribution. The program or a part thereof may be transmitted via a transfer medium including a wired network, which is used in a local-area network (LAN), a metropolitan-area network (MAN), a wide-area network (WAN), the Internet, an intranet, and an extranet, a wireless network, or a combination thereof by the communication. The program or a part thereof may also be transmitted over a carrier wave.

Further, the above-described program may be a part of another program, or may be stored in the recording medium together with another program. The program may be split to be stored in a plurality of recording media. The program may be processed in any fashion before being stored as long as the program remains restorable, such as being compressed or encrypted.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a storage device that stores an inverted index in which documents and features of the documents are associated; and
   a computer configured to function as:
   an extraction unit that extracts features of a selected document from the inverted index;
   a retrieval unit that retrieves a document having any one of the extracted features;
   a selection unit that selects a first feature and one or more subsequent features from the extracted features; and
   a presentation unit that presents a combination of the features selected by the selection unit, as a retrieval condition, wherein
   the first feature is associated with the least number of the documents among the extracted features, and
   each subsequent feature (i) is associated with the least number of the documents having all of the previously selected features among the extracted features, or (ii) is a feature of which an angle with a previously selected feature vector is closest to the orthogonal among the extracted features.

2. The information processing apparatus according to claim 1, wherein the presentation unit presents the features in order of selection by the selection unit.

3. The information processing apparatus according to claim 1, wherein the selection unit selects a feature corresponding to a degree of familiarity of a user.

4. The information processing apparatus according to claim 1, wherein the extraction unit extracts negation of a feature of the selected document from the inverted index.

5. The information processing apparatus according to claim 1, wherein the presentation unit presents a result of retrieval performed using a combination of the features selected by the selection unit as a retrieval condition.

6. An information processing method comprising:

extracting features of a selected document from an inverted index in which documents and features of the documents are associated, the inverted index being stored in a storage device;

retrieving a document having any one of the extracted features;

selecting a first feature and one or more subsequent features from the extracted features; and presenting a combination of the features selected in the selecting, as a retrieval condition, wherein the first feature is associated with the least number of the documents among the extracted features, and each subsequent feature (i) is associated with the least number of the documents having all of the previously selected features among the extracted features, or (ii) is a feature of which an angle with a previously selected feature vector is closest to the orthogonal among the extracted features.

7. A non-transitory computer readable medium storing an information processing program for enabling a computer to function as:

an extraction unit that extracts features of a selected document from an inverted index in which documents and features of the documents are associated, the inverted index being stored in a storage device;

a retrieval unit that retrieves a document having any one of the extracted features;

a selection unit that selects a first feature and one or more subsequent features from the extracted features; and a presentation unit that presents a combination of the features selected by the selection unit, as a retrieval condition, wherein the first feature is associated with the least number of the documents among the extracted features, and each subsequent feature (i) is associated with the least number of the documents having all of the previously selected features among the extracted features, or (ii) is a feature of which an angle with a previously selected feature vector is closest to the orthogonal among the extracted features.

* * * * *